United States Patent
Pettersson et al.

(10) Patent No.: US 7,219,782 B2
(45) Date of Patent: May 22, 2007

(54) DEVICE AND METHOD FOR DETECTION OF A GEAR POSITION IN AN AUTOMOTIVE GEARBOX

(75) Inventors: Magnus Pettersson, Sodertalje (SE); Matts Jargenstedt, Sodertalje (SE)

(73) Assignee: Scania CV AB (publ) (SE)

( * ) Notice: Subject to any disclaimer, the term of this patent is extended or adjusted under 35 U.S.C. 154(b) by 203 days.

(21) Appl. No.: 11/051,156

(22) Filed: Feb. 4, 2005

(65) Prior Publication Data

US 2005/0178634 A1 Aug. 18, 2005

(30) Foreign Application Priority Data

Feb. 17, 2004 (SE) ................................ 0400354

(51) Int. Cl.
*F16H 61/70* (2006.01)

(52) U.S. Cl. .................. 192/3.62; 192/3.63; 74/336 R; 74/745; 701/64

(58) Field of Classification Search ............ None
See application file for complete search history.

(56) References Cited

U.S. PATENT DOCUMENTS

| | | | | |
|---|---|---|---|---|
| 4,320,381 A | * | 3/1982 | Olivier | ............. 340/439 |
| 5,537,894 A | * | 7/1996 | Chan | ............. 74/745 |
| 5,921,135 A | * | 7/1999 | Friedrich et al. | ............. 74/335 |

FOREIGN PATENT DOCUMENTS

JP  08159258 A  *  6/1996

* cited by examiner

*Primary Examiner*—Richard M. Lorence
(74) *Attorney, Agent, or Firm*—Ostrolenk, Faber, Gerb & Soffen, LLP

(57) ABSTRACT

A gear position in an automotive gearbox is detected on the basis of measuring a value indicative of the speed of a rotating shaft between an engine and the gearbox, and a value indicative of the speed of an output shaft from the gearbox, and calculating a quotient of these two speeds. If for a predetermined period of time the quotient is between upper and lower limits about a quotient value pertaining to the respective gear position, it is decided that a gear position obtains. Through information about a selected split position of a split gear it is as possible gear position rule out all gear positions which do not correspond to the selected split position, thereby enabling said upper and lower limits to be raised and lowered respectively for the remaining gear positions which correspond to the selected split position.

15 Claims, 2 Drawing Sheets

DEVICE AND METHOD FOR DETECTION OF A GEAR POSITION IN AN AUTOMOTIVE GEARBOX

BACKGROUND OF THE INVENTION

The invention relates to a device and a method for detection of gear position in an automotive gearbox. It is applicable in principle to any desired engine with associated gearbox, but the case hereinafter described to illustrate and exemplify the invention is that where such a device is arranged in a motor vehicle, more particularly in a bus or a truck.

For a number of different reasons it is important for an arrangement for controlling an engine which is adapted to powering a load in the driveline, i.e. the power transmission path, downstream from a gearbox, to have knowledge about the extent to which a gear position is established and which gear position it is. For example, a protection for a clutch arrangement for disengaging the gearbox from the engine only becomes disconnected when a gear position has been detected, with the result that the engine can then be controlled to deliver the torque which the vehicle driver or engine operator requires. This cannot take place until a gear position has been reliably detected.

In some transmissions, different gear positions may also tolerate different amounts of torque, in which case it is important to know, preferably as quickly as possible, which gear position the gearbox is in, in order to spare sensitive parts of the transmission.

Information about a gear position can also be used, e.g. as regards trucks, for weight estimation, i.e. for calculating how much a truck weighs. It is important that this be done during the acceleration phase, and it has been found that the most reliable results are achieved through measurements made when a gear position has just been reached, since this is the time when the torque delivered by the engine and acceleration can best be measured.

In all the above-mentioned cases it is desirable to detect as quickly as possible that a gear position obtains.

For detection of gear position in an automotive gearbox, there are known devices of the type based on detecting the respective speeds of the driveline upstream from the clutch and downstream from the gearbox and calculate a quotient of these speeds and comparing this quotient with values of such a quotient determined for each gear position of the gearbox. It is thus decided that a gear position obtains if for a predetermined period of time this quotient is between upper and lower limits about the quotient value pertaining to the respective gear position.

Such a device is previously known, e.g. from U.S. Pat. Nos. 5,921,135 and 4,320,381. Even if those devices function reliably, it is desirable, for the reasons indicated above, to increase their speed and also, if possible, the reliability of their detection of gear position.

The former is of particular importance in the case of a motor vehicle, since the driver may be irritated by having to wait for a clutch protection to be disengaged, e.g. when starting the vehicle.

It should be noted that the invention is directed at detection of gear positions in automotive gearboxes which comprise a so-called split gear for defining at least two gear positions, so-called split positions, relating to each gear position otherwise defined by the gearbox.

SUMMARY OF THE INVENTION

The object of the present invention is to provide a device and a method of the kind discussed above which satisfy the above-mentioned desiderata.

This object is achieved according to the invention.

This way of determining a gear position utilising information about a selected split position and ruling out as possible gear positions at least every second gear position makes it possible to be significantly more generous when determining a range defined by said upper and lower limits about a given gear position, without any risk of such possible ranges coming too close to one another or of incorrect conclusions being drawn about a gear position. Such broader ranges entail a number of advantages.

It will be possible to determine a gear position earlier, since said quotient based on driveline speeds will come within said limits sooner, with the result that said predetermined period of time will end earlier. This means that an arrangement for controlling the engine receives information earlier about a gear position being engaged and can therefore control the engine in a desired manner sooner. More specifically, said coupling protection can be disengaged and the torque required by the driver can be delivered earlier.

In said weight estimation, earlier determination of an established gear position means that the so-called "right time" for executing measurements of torque and acceleration is lengthened, with the result that it becomes more convenient to execute these measurements, and it will also be possible for measurements to be effected over a period of time which yields still more reliable results.

Another advantage of the greater interval between upper and lower limits about a said quotient value is that gear position detection becomes less sensitive to oscillatory phenomena. Even if the driveline is composed of seemingly rigid shafts, they are not entirely rigid under load, with the result that various mutual fluctuations of said speeds for a given gear position, and hence variations in the calculated quotient, will occur. This means that previous known devices with a possibility of being able to engage any desired gear and hence with a narrower range about each quotient value entail risk that over a certain period of time said calculated quotient may go outside the range, in which case such a device will decide that the gear position no longer obtains, despite this actually being the case. The device according to the invention is significantly less sensitive to such oscillatory phenomena, since said interval can be made and is made significantly greater.

According to an embodiment of the invention, the arrangement is adapted, in the absence of information about a selected split position, to effecting quotient comparison with upper and lower limits for each gear position which are closer together than when this information is available. This means that the device functions irrespective of the presence of information about a selected split position, but when this information is available, which is regarded as being the natural situation, it is then utilised in the advantageous manner described above.

According to another embodiment of the invention, the device comprises a memory means comprising a table of gear positions and relating quotient values as well as said upper and lower limits for the respective quotient values, or only said table. Such a memory means with a table of gear positions and relating quotient values for the gearbox concerned is advantageous, but said upper and lower limits might be calculated by a suitable unit instead of being stored.

According to another embodiment of the invention, the device comprises a means adapted to detecting the position of a pedal for disengaging the gearbox from the engine, and to sending information about this to the arrangement, and the arrangement is adapted to applying the additional condition that for a gear position to be regarded as obtaining, the clutch pedal needs to be above a specified level which rules out disengagement of the gearbox. The risk of a gear position being regarded as obtaining because said quotient has a determined value, despite the gearbox being disengaged from the engine, is thus prevented. For a gear position to be regarded as obtaining, it is in fact necessary that there be no interruption of the driveline between the engine and the gearbox output shaft.

According to another embodiment of the invention, the device comprises a means adapted to filtering the quotient calculated by the arrangement, before the arrangement effects the comparison, in order to remove from it oscillations due to rapid variations in the results of the detections by the first and/or second means. The reliability of gear position detection is thus increased.

The invention also relates to use of a device according to the invention for detection of gear position in an automotive gearbox in a motor vehicle, e.g. a bus or truck. The advantages of such use are indicated by the foregoing description of the device according to the invention.

The invention also relates to a computer program. It will readily be appreciated that the invention's method is well suited to being implemented on the basis of program instructions from a processor which may be acted upon by a computer program provided with the relevant program stages.

Other advantages and advantageous features of the invention are indicated by the ensuing description and the claims.

BRIEF DESCRIPTION OF THE DRAWINGS

A device and a method according to, and an embodiment quoted by way of example of, the invention are described below with reference to the attached drawings, in which.

DETAILED DESCRIPTION OF THE PREFERRED EMBODIMENT OF THE INVENTION

Figure 1:
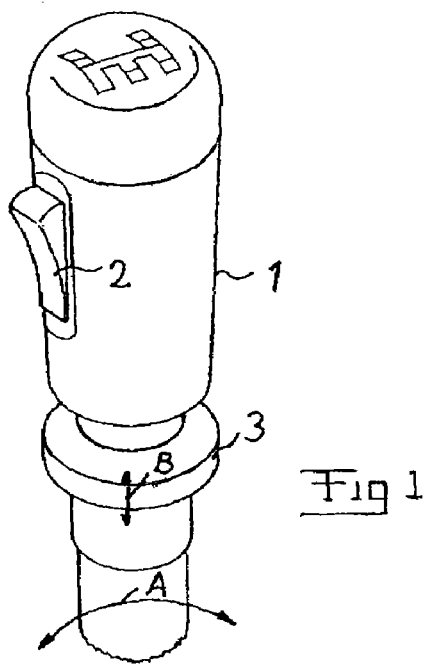
FIG. 1 is a very schematic view of a conventional gear lever of a motor vehicle of the bus or truck type.

FIG. 1 illustrates schematically a conventional gear lever (with the appearance which it might have, for example, in a truck) for change of gear position in an automotive gearbox. This gear lever 1 comprises three different means for setting gear positions in a gearbox. These three means act upon gear segments situated in series in the gearbox. One of these means is the lever 1 itself, which may be moved in the direction of the arrow A, for example, to set three different gear positions 1, 3 and 5. The lever's second means 2 takes the form of a switch for setting two discrete gear positions of a so-called split gear. One of these gear positions is called low and causes the gear position set by the gear lever 1 to occur, while the second position is called high and defines a gear position which is a step higher towards an increasing transmission ratio than the gear position indicated by the lever, but a step lower than the lever gear position which, in the direction of increased transmission ratio, follows the lever gear position set. This means that when the switch is in the last-named position, gear positions 2, 4 and 6 can be reached.

The third means for selection of gear position is a selector means in the form of an element 3 movable according to the arrow B, which entails a transfer of gearbox transmission between two different states via a so-called range gear. In one of these states, gears 1–6 can be set via the lever 1 and the switch 2, whereas, in the other state of the range gear, gears 7–12 can be set via the lever 1 and the split position switch 2. This is conventional technology and the three gears connected in series may for example have the following selectable factors which have to be multiplied by one another to arrive at the gearbox's total transmission ratio:

the split gear: 1 and 1.233
the ordinary gear (the lever): 1, 1.549 and 2.461
the range gear: 1 and 3.750

The lower the factor, the higher the gear. Thus in the highest gear, viz. gear 12, the transmission ratio of the gearbox is defined as unity. In this case the twelve gears will have the following quotients between the speeds of the input shaft and output shaft of the gearbox:

1: 11.379
2: 9.227
3: 7.166
4: 5.811
5: 4.625
6: 3.750
7: 3.034
8: 2.461
9: 1.911
10: 1.549
11: 1.233
12: 1.000

Figure 2:
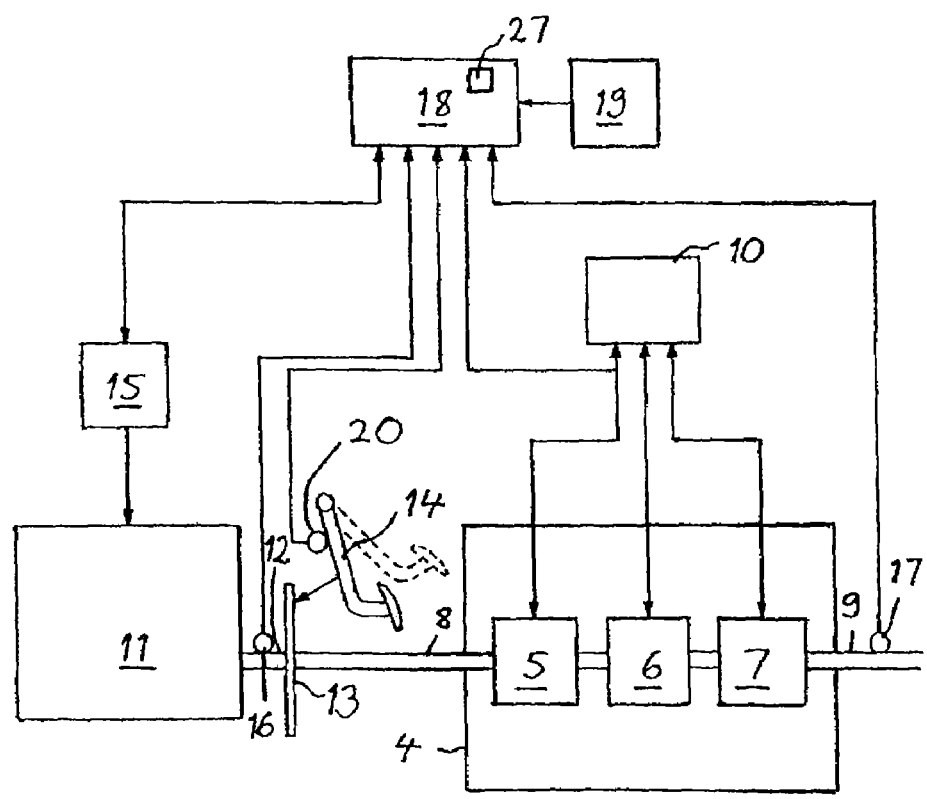
FIG. 2 is a simplified block diagram illustrating a device and a method according to an embodiment of the invention.

FIG. 2 illustrates schematically a device for detection of gear position in an automotive gearbox represented schematically by the depicted box 4. It illustrates how in the automotive gearbox 4 a split gear 5, an ordinary gear 6 and a range gear 7 as above are connected in series between the input shaft 8 and output shaft 9 of the gearbox. These gears are controlled by the action, summarised by the box 10, of the lever 1, the switch 2 and the range gear ring 3. Ref. 11 schematically represents an engine. Via a shaft 12, the engine's output shaft is connected directly or indirectly (usually indirectly by a permanent stepdown of its speed) to a clutch 13 arranged to transmit the engine's torque to the gearbox input shaft 8. Downward pressure on a clutch pedal 14 enables the clutch 13 to disengage the shafts 12 and 8 from one another so that the gear position can be changed without the engine transmitting any torque to the shaft 8. An engine control arrangement 15 is adapted to controlling the engine.

The device comprises a first means 16 adapted to detecting a value indicative of the speed of the rotating shaft 12 connected to the clutch on the engine side, while a second means 17 is adapted to detecting a value indicative of the speed of the gearbox output shaft 9. These first and second means need not directly detect the respective speeds, as depicted in FIG. 2, as the first means may for example be adapted to detecting the speed of the vehicle's generator, flywheel or some other item permanently connected to the engine. In a corresponding manner, the second means may be arranged relative to the vehicle's differential gear or the like. Both means are intended to send information about the speeds detected to an arrangement 18 which is itself adapted to calculating the quotient of the two speeds (in this case the speed detected by the means 16 divided by the speed detected by the means 17) and, after filtering of this quotient, to comparing it with values of such a quotient determined for each gear position of the gearbox. A memory means 19 provides the arrangement 18 with information about such values in the form of a table of gear positions and relating quotient values. The purpose of the filtering is to remove oscillations from the quotient which are due to rapid variation in the results of the respective detections by the first and/or second means 16 and 17.

The split position switch 2 is adapted to sending information about a selected split position to the arrangement 18, which is itself adapted to responding to information about the selected split position by ruling out as possible gear positions all gear positions which do not correspond to the selected split position. This means that in the case here concerned every second gear position can be ruled out. Should for example a split position switch with three discrete positions be used, only every third gear position would correspondingly be possible. The arrangement 18 comprises a microcomputer with a computer program 27 designed to control the functions of the arrangement.

The device also comprises a means 20 adapted to detecting the position of the clutch pedal 14 and sending information about this to the arrangement 18, which is itself adapted to regarding it as a requirement, for a gear position to be regarded as obtaining, that the clutch pedal be beyond a specified limit which rules out disengagement of the gearbox.

The arrangement 18 is adapted to deciding by said comparison that a gear position obtains if for a predetermined period of time, e.g. half a second, the calculated quotient is between upper and lower limits about the quotient value pertaining to the respective gear position. In the case here concerned, comparison of the speeds of the shafts 12 and 9 may show that these quotient values for the respective gear position are the same as the values set out above for gears 1–12.

Said upper and lower limits are selected by the arrangement so that at the respective possible gear positions they define ranges in such a way that there is a gap between adjacent said ranges. The fact that information about the split position makes it possible to rule out every second gear position means that these ranges can be made greater, i.e. the upper limit can be raised and the lower limit lowered for the remaining gear positions which correspond to the selected split position. The practical consequences of this for gear position detection will now be explained with reference to the diagram in FIG. 3.

Figure 3:
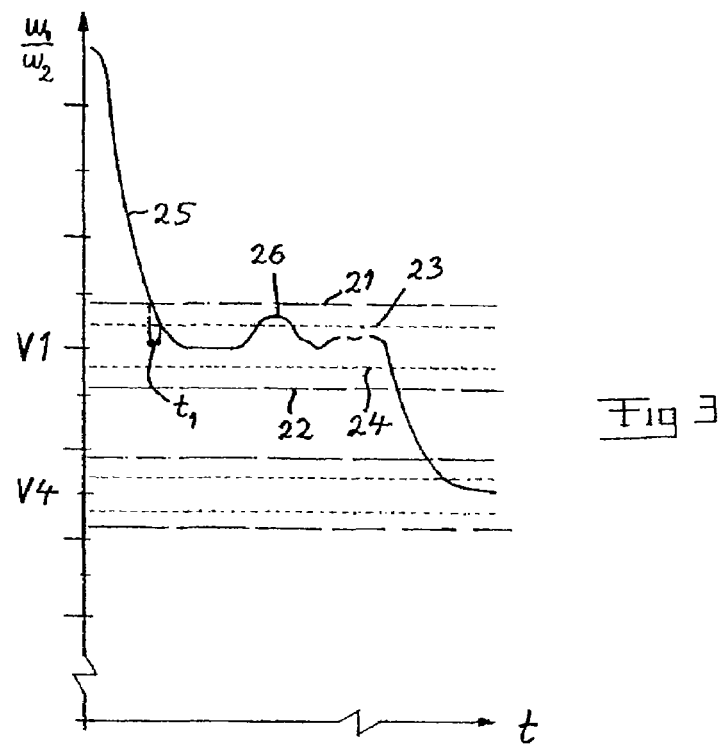
FIG. 3 is a schematised diagram of the chronological pattern of the quotient between the speed of a rotating shaft upstream from the clutch and the speed of the gearbox output shaft of a motor vehicle provided with the device according to the invention.

FIG. 3 illustrates in a very simplified way what may happen to the quotient of the speeds measured by the means 16 and 17 when a vehicle which has the parts depicted in FIG. 2 is being set in motion. It shows the quotient values pertaining to the various gear positions 1–6. In the case here concerned, the split position switch is imagined as being in a position which indicates that only gears 1, 3 and 5 are possible, with the result that gears 2, 4 and 6 can be ruled out. This means that said upper and lower limits 21 and 22 respectively can be applied, at a short distance from one another, about each possible gear position, as indicated by the lines with few breaks, whereas lack of knowledge of the split position would instead have resulted in their being where the lines 23 and 24 (lines with many breaks) are situated.

When gear 1 is engaged by operating the lever 1 and the clutch pedal is released and the clutch discs begin to engage with one another, said quotient 25 declines towards the selected gear position. When for a certain period of time the quotient has been within a range defined by said upper and lower limits about a quotient value, the arrangement decides that a gear position obtains, provided that the clutch pedal 14 has been allowed to rise far enough. This means that when the engine control arrangement 15 receives information that the clutch protection can be disengaged, the torque required by the driver can be applied. From this time it is also possible, for example, to do measurements for estimating the weight of the vehicle. The information that a given gear position obtains can also be used to spare the transmission of such transmission systems in which certain gear positions tolerate less torque than others.

FIG. 3 shows that knowledge of the split position results in the quotient value arriving between said upper and lower limits earlier by a time $t_1$ than would otherwise be the case. For a given length of said predetermined period of time, the occurrence of a gear position can thus be identified $t_1$ earlier than otherwise.

Also illustrated at 26 is the way in which oscillatory phenomena in the driveline of the vehicle may cause said quotient to vary despite there being no change in the gear position, with the result that in the absence of information about the split position it would, for a predetermined period of time, be above said upper limit and the arrangement would therefore decide that the gear position no longer obtained. However, information about the split position may cause said upper and lower limits to be so far apart so as to rule out any such incorrect decision in this case.

FIG. 3 illustrates what happens when the split position switch is subsequently switched to its second position, i.e. high position, and the gear lever is at the same time moved to an adjacent gear position so that gear 4 is engaged. Here again said upper and lower limits about the quotient value for gear 4 are depicted for the two cases of knowledge of the split gear position and lack of such knowledge.

Figure 4:
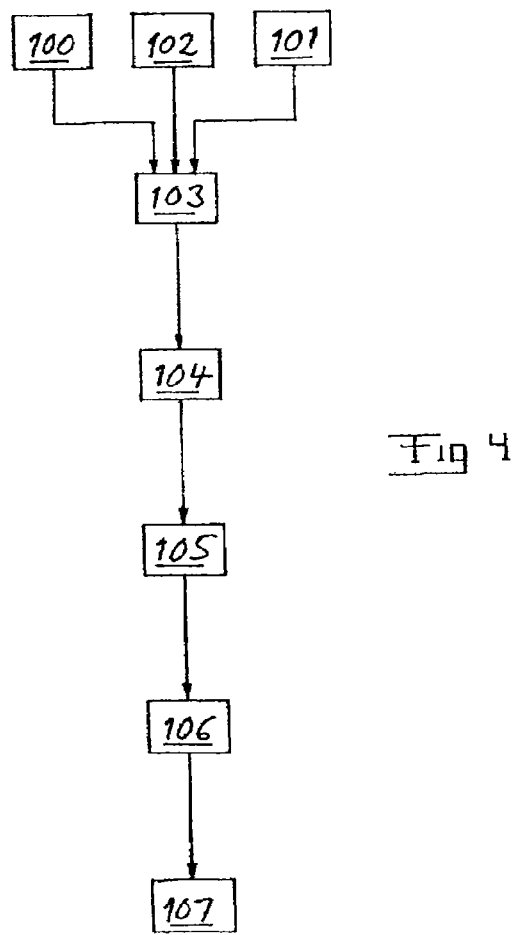
FIG. 4 is a flowchart illustrating the various stages of a method according to an embodiment of the invention.

FIG. 4 illustrates very schematically the flowchart for implementing a method according to the invention, whereby the respective speeds of the shafts leading to the clutch and leaving the gearbox are measured at 100 and 101 respectively and the position of the clutch pedal is measured at 102. The quotient between the two speeds is calculated at 103, and this quotient is filtered at 104 and compared with tabulated quotient values for the various gear positions at 105. The current split position is taken into account. The time for which the calculated quotient remains within the aforesaid limits is taken at 106 and a message that a gear obtains is sent to the engine control arrangement or other components of the vehicle at 107.

The invention is of course in no way limited to the embodiment described above, as a multiplicity of possibilities for modification thereof are likely to be obvious to a specialist within the field without thereby having to deviate from the basis concept of the invention as it is defined in the attached claims.

It is for example clear that the device can be applied to automotive gearboxes which have no range gear or differ in some other way from the embodiment described above.

It would also be possible to use information about a reverse gear being engaged or not engaged in order to be able to rule out also the gear positions which do not correspond to that information. For example, a circuit-breaker may be arranged in the gearbox and be closed when a reverse gear becomes engaged and opened when it becomes disengaged. Any of the vehicle's reverse gears may have a transmission ratio which is close to any of the forward lower gears, for which said upper and lower limits may be raised or lowered respectively for certain gear positions if this reverse gear information is available.

What is claimed is:

1. An apparatus for detecting a gear position in a gearbox of an automotive vehicle, wherein the vehicle on which the apparatus is operable includes an engine, a rotating shaft of the engine, the gearbox, an operable clutch between the engine and the gearbox for selectively connecting the engine to the gearbox and for disconnecting the engine from the gearbox;

the gearbox comprising:
at least a first and a second gear at respective first and second gear positions as regards respective first and second gear ratios;
a split gear for defining at least two split gear positions relating to the first and second gear positions of the gearbox, one of the split gear positions being one of the first and second gear positions and the other of the split gear positions being of a gear ratio other than gear ratios of the first and second gear positions;
a selector for selecting the split position of the split gear; and
an output shaft of the gearbox;

the apparatus for detecting comprising:
a first detector for detecting a second value indicative of a speed of the engine or of the shaft of the engine on an engine side of the clutch;
a second detector for detecting a value indicative of a speed of the output shaft of the gearbox or of a rotating shaft driven by the output shaft;
a calculating arrangement operable to calculate a quotient of the first value indicative of the speed of the engine or of the rotating shaft of the engine to the second value indicative of the speed of the output shaft of the gearbox or of the rotating shaft driven by the output shaft of the gearbox, the calculating arrangement being operable to compare the calculated quotient with predetermined quotient values set in the arrangement for each of the gear positions of the gearbox and to set upper and lower limits about the quotient value for the respective gear positions, the calculating arrangement operable to determine whether each of the gear positions of the gearbox has the respective calculated quotient within the upper and lower limits for the respective gear positions;
the selector for selecting the split position of the split gear being operable to send information about the selected split position to the calculating arrangement; and
the calculating arrangement operable to respond to information received from the selector concerning the selected split position and being operable to eliminate as a possible gear position of the gearbox for the calculation any gear position not corresponding to the selected split position of the split gear selected by the selector and operable, based upon the quotient comparison, to then raise the upper limit and lower the lower limit around the quotient value for remaining gear positions which at the time correspond to the selected split position of the split gear.

2. The apparatus of claim 1, wherein the gearbox further comprises a third of the gears at a respective third gear position as regards a respective third gear ratio, and the split gear for defining at least two split gear positions including a gear position at one of the first, second and fourth gear positions and the other gear position not at one of the first, second and third gear positions.

3. The apparatus of claim 2, wherein one of the split gear positions is the one of the first, second and third gear positions of the gear and the other third of the split gear positions is the nearest of the other ones of the first, second and fourth gear positions.

4. The apparatus of claim 1, wherein when the calculating arrangement does not receive information from the selector about the selected split position, the arrangement is operable to perform the quotient comparison by setting the upper limit and the lower limit for each gear position for which limits are closer to each other than when the calculating arrangement receives information about the selected split position.

5. The apparatus of claim 1, wherein the gearbox is such that the ranges of the quotient comparisons for the gear positions are respectively different enough and the calculating arrangement is operable to select the respective upper limit and lower limit of the possible gear positions such that a respective range of the upper limit and the lower limits of the quotient values of the gear positions is such that there is a gap between adjacent ranges of upper and lower limits such that the ranges do not overlap.

6. The apparatus of claim 1, further comprising a memory connected with the calculating arrangement and comprising a table of gear positions with respective related quotient values for each of the gear positions and upper and lower limits for the respective quotient values.

7. The apparatus of claim 1, wherein the selector comprises a split position switch having at least two discrete gear selecting positions.

8. The apparatus of claim 7, wherein a first one of the discrete positions is a low position corresponding to a first gear position and a second one of the discrete position is a high position between the first gear position and a next higher gear position, wherein the next higher gear position includes a lower transmission ratio than the preceding first gear position.

9. The apparatus of claim 1, further comprising:
a clutch operating device for selectively operating the clutch between an engaged and a disengaged position, the clutch operating device comprising a third detector operable to detect the position of the clutch for disengaging the gearbox from the engine, and the third detector being operable to send information about disengagement of the clutch from the calculating arrangement;
the calculating arrangement being operable when the clutch operating device operates outside a specified limit indicating the gearbox is not disengaged from the engine by disengaging operation of the clutch, as a further condition for the gear position to be regarded as obtaining by the calculating arrangement.

10. The apparatus of claim 1, wherein the calculating arrangement is operable to determine passage of a specified period of time during which the calculated quotient is outside a range bounded by the upper and lower limits about the quotient value pertaining to the nearest previous gear position and to then determine that the gearbox is no longer in the previous gear position.

11. The apparatus of claim 1, further comprising a filter for filtering the quotient calculated by the calculating arrangement operable for removing oscillations of the quotient due to variations in the results of the detections by the first and the second detector, and the calculating arrangement being operable after a filtering operation of the filter.

12. The apparatus of claim 1, wherein the calculating arrangement is operable to calculate the quotient by dividing the speed detected by the first detector by the speed detected by the second detector.

13. The apparatus of claim 1, wherein the first detector is operable to detect the speed of the output shaft from the engine and the second detector is operable to detect the speed of the output shaft from the gearbox.

14. A method for detecting a gear position of a gearbox in an engine of a vehicle, wherein the vehicle engine includes a rotating shaft, the gearbox and a clutch movable between an engaging and disengaging position and disposed between the engine and the gearbox;

the gearbox having a plurality of gear positions, the gearbox being a split gearbox operable to define at least two split gear positions, as regards transmission ratios in the gearbox, including a first and a second split gear position as regards their transmission ratios, and a selector for selecting the split position of the split gear;

the first split gear position being one of the plurality of gear positions of the gearbox and the second split gear position being between the one of the gear positions and another gear position nearest the one of the gear positions;

the method comprising:

selecting one of the gear positions;

selecting the first of the split gear positions;

detecting a first value indicative of a speed of a rotating shaft extending from the engine to the clutch;

detecting a second value indicative of a speed of an output shaft of the gearbox or of a rotating shaft driven by the output shaft of the gearbox;

calculating a quotient of the first and the second values;

comparing the calculated quotient of the values with respective values of such a quotient predetermined for each of several gear positions of the gearbox;

the comparison comprising considering information concerning the selected split position and ruling out of consideration gear positions other than the selected gear position and the selected first split gear position, and based on the quotient comparison, raising the upper limit and lowering the lower limit about the quotient for each of the remaining gear positions which also correspond to the selected first split position; and determining that one of the gear positions of the gearbox has been obtained if for a predetermined period of time the calculated quotient is between selected upper and lower limits about the quotient value of the one of the respective gear positions.

15. The method of claim 14, wherein the detecting method is performed on a computer including a computer program loadable into the internal memory of the computer and comprising software operative to control the quotient calculation step and the comparison step.

\* \* \* \* \*